United States Patent [19]

Datta et al.

[11] Patent Number: 5,662,878
[45] Date of Patent: Sep. 2, 1997

[54] PROCESS FOR THE PRODUCTION OF HYDROGEN PEROXIDE

[75] Inventors: Rathin Datta, Chicago; Sarabjit S. Randhava, Evanston; Shih-Perng Tsai, Naperville, all of Ill.

[73] Assignee: University of Chicago, Chicago, Ill.

[21] Appl. No.: 637,864

[22] Filed: Apr. 25, 1996

[51] Int. Cl.⁶ .................................................. C01B 15/023
[52] U.S. Cl. ............................................ 423/588; 210/640
[58] Field of Search ............................ 423/588, 589, 423/590, 584; 210/640, 641

[56] References Cited

U.S. PATENT DOCUMENTS

| | | | |
|---|---|---|---|
| 2,158,525 | 5/1939 | Riedl et al. | 423/588 |
| 2,215,883 | 9/1940 | Riedl et al. | 423/588 |
| 3,009,782 | 11/1961 | Porter | 423/588 |
| 3,923,967 | 12/1975 | Kirchner et al. | 423/588 |
| 5,147,628 | 9/1992 | Simon et al. | 423/588 |
| 5,538,640 | 7/1996 | Wijmans et al. | 210/640 |

FOREIGN PATENT DOCUMENTS 293524  10/1992  Japan ..................... 423/588

*Primary Examiner*—Wayne A. Langel
*Attorney, Agent, or Firm*—Cherskov & Flaynik

[57] ABSTRACT

An integrated membrane-based process method for producing hydrogen peroxide is provided comprising oxidizing hydrogenated anthraquinones with air bubbles which were created with a porous membrane, and then contacting the oxidized solution with a hydrophilic membrane to produce an organics free, $H_2O_2$ laden permeate.

20 Claims, 1 Drawing Sheet

PROCESS FOR THE PRODUCTION OF HYDROGEN PEROXIDE

CONTRACTUAL ORIGIN OF THE INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

1. Field of the Invention

This invention relates to a method for producing hydrogen peroxide, and more specifically, this invention relates to a method for producing hydrogen peroxide via the utilization of advanced membrane technology 2. Background of the Invention Environmental considerations and regulations continue to prompt industries to use compounds which are less detrimental to the ecosystem. One example is the dramatic increase in the use of hydrogen peroxide for pulp and paper industry applications. Instead of relying on chlorine and chlorine dioxide bleaching processes, many paper producers now utilize chemithermo-mechanical pulping where hydrogen peroxide facilitates pulp brightness. The use of hydrogen peroxide in this industry has increased-to approximately 300,000 metric tons, which is 50 percent of current North American production capacity. Such usage will continue to increase significantly.

The use of hydrogen peroxide is expanding quickly in other markets as well, such as in water and waste treatment, mining, chemical processing, textiles and industrial cleaning. Current world wide production annually is 1.4 million metric tons, with a 7 percent annual growth rate.

Hydrogen peroxide production is controlled by a few chemical companies that produce it in large scale plants as a 70 percent concentrate. However, the highly oxidative characteristics of that level of concentration requires nearly immediate dilution to 50 percent concentration for safe transport. Ultimately, hydrogen peroxide is used in concentrations of approximately 5–10 percent. Typical $H_2O_2$ production processes are based on anthraquinone reduction-oxidation chemistry. The typical process steps are (1) hydrogenation of anthraquinone working solution in a fixed bed reactor; (2) separation of the catalyst fines; (3) oxidation of the hydrogenated anthraquinone working solution by air in a multi-stage packed bed tower while simultaneously producing $H_2O_2$ in the organic stream; (4) extraction of the $H_2O_2$ from the anthraquinone working solution by water in a multistage counter-current extraction column process; (5) recovery and polish purification of the anthraquinone working solution, the accompanying solvents, and their recycle to the hydrogenator; and (6) recovery, polish purification and-stabilization of the $H_2O_2$ product.

The typical process outlined above, disclosed in U.S. Pat. Nos. 2,158,525 and 2,215,883 to Pfliderer and Riedel, respectively is suitable for large scale production of $H_2O_2$. However, the process is unsuitable for small scale production (500–1,000 metric tons per year) and medium scale production (5,000 metric tons per year). This is because the packed tower used for oxidation, and the column for $H_2O_2$ extraction are very large and do not easily scale up or down for modularity and operational flexibility. For example, for a nominal 5,000 metric ton per year mini-plant, the oxidation-tower will have three beds 4.5 feet in diameter and 15 feet tall, stacked in series. The height of the equipment for this single oxidation process is more than 60 feet.

Conventional processes to extract $H_2O_2$ from reaction liquor also has several drawbacks. Such processes utilize counter-current, multi-stage, liquid-liquid extraction of the anthraquinone working solution (AQS) with water. However, these procedures result in a very low (1:20, i.e., one part water extract to 20 parts of AQS) phase ratio between water extract and the AQS. $H_2O_2$ concentration in the aqueous fraction has to be high in these processes so that subsequent $H_2O_2$ isolation steps can proceed more economically. As such, typical extractors are multi-stage, very large in volume and difficult to scale down. These systems can be highly unstable and thus require a high degree of operational control. Finally, a certain amount of the polar solvents also enters the final aqueous phase in these processes. This results in contamination of the $H_2O_2$ phase and ultimately, loss of the solvent. Typical extraction equipment has 23 countercurrent stages and is approximately 100 feet tall.

Efforts have been made to minimize ancillary reducing reactions (leading primarily to nuclear hydrogenation of the aromatic nuclei of the working solution) to prevent loss of solvent and anthraquinone feedstock (U.S. Pat. No. 3,009, 782 to Porter). However, final fractions of $H_2O_2$ still contain high levels of organic contaminants that require further isolation and polishing.

Finally, and not surprisingly, the costs associated with the typical highly capital- and energy-intensive, large scale hydrogen peroxide processes are passed on to low-volume end users. These end users would benefit from methods for producing hydrogen peroxide more economically.

A need exists in the art for a process to produce hydrogen peroxide without the concomitant capital costs and handling problems associated with current production schemes. The process would allow effective $H_2O_2$ production in small plant environments and therefore would have a small size or footprint compared to the footprint of the "host" industrial site. Finally, the $H_2O_2$ process would be as modular as possible with the ability for quick start-up, shut-down and turnaround, while also accommodating variability in production rates.

SUMMARY OF THE INVENTION

It is an object of the present invention to provide a method for producing hydrogen peroxide that overcomes many of the disadvantages and shortcomings of the prior art.

It is another object of the present invention to provide a process for economically producing hydrogen peroxide. A feature of the invention is the utilization of membrane technologies to isolate hydrogen peroxide from the process reaction liquid. An advantage of the invention is the rendering of hydrogen peroxide that is virtually free of organics. Another advantage of the invention is the ability to retain expensive organic solvents in reaction liquors for reuse.

Yet another object of the present invention is to provide a modularized process for producing hydrogen peroxide. A feature of the process is supplanting multi-stage packed bed oxidation towers found in typical peroxide production systems with membrane systems. An advantage of the invention is the minimization of the footprint and costs associated with the production of hydrogen peroxide.

Briefly, a method for producing hydrogen peroxide is provided comprising supplying an anthraquinone-containing solution; subjecting the solution to hydrogen to hydrogenate the anthraquinone; mixing air with the solution containing hydrogenated anthraquinone to oxidize the solution; contacting the oxidized solution with a hydrophilic membrane to produce a permeate; and recovering hydrogen peroxide from the permeate.

BRIEF DESCRIPTION OF THE DRAWING

These and other objects and advantages of the present invention will become readily apparent upon consideration of the following detailed description and attached drawing, wherein.

DETAILED DESCRIPTION OF THE INVENTION

Figure 1:
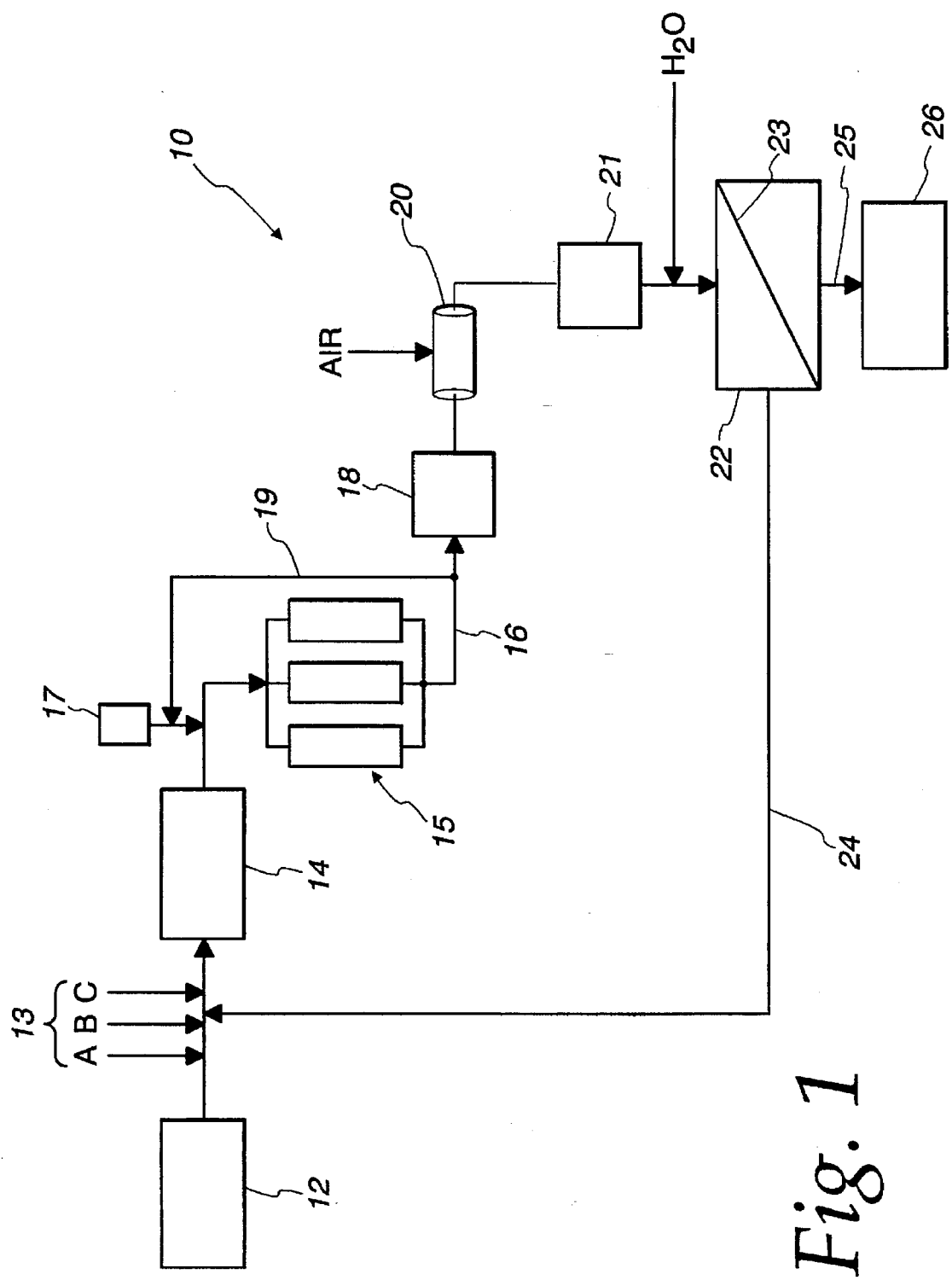
FIG. 1 is a schematic diagram of a method for producing hydrogen peroxide, in accordance with the present invention.

The present invention provides an improved process for production of $H_2O_2$ via mini-plants by the use of advanced membrane technologies of perfusion, perstraction and pervaporation.

The invented process revolves around the well known successive hydrogenation and oxidation of alkytanthraquinones depicted below in Equations 1 and 2.

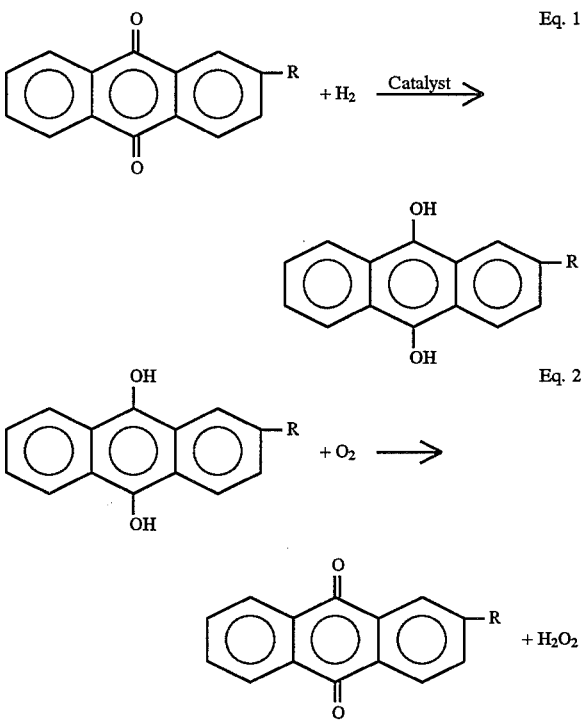

where R connotes an alkyl group, such as ethyl, and the hydrogenation catalyst is any suitable catalyst that fosters the reduction of the quinone group to the hydroquinone group.

An exemplary embodiment of the invented process is designated as numeral 10, in FIG. 1. Briefly, starter anthraquinone material 12 is first selected. While a myriad of alkyl anthraquinones are suitable for $H_2O_2$ production, the inventors choose to illustrate their process using 2-ethyl anthraquinone and-tetrahydro 2-ethyl anthraquinone as the starter anthraquinone material 12. However, the choice of starter materials here should not be construed as limiting the invented process to these species. Rather, a myriad of working materials are suitable, including, but not limited to, 2-ethylanthraquinone, 2-isopropylanthraquinone, 2-sec-butylanthraquinone, 2-t-butylanthraquinone, 2-sec-amylanthraquinone, 1,3-dimethylanthraquinone, 2,3-dimethyl-anthraquinone, 1,4 dimethylanthraquinone, 2,7-dimethylanthraquinone, amylanthraquinone, tetrahydroamylanthraquinone and combinations thereof.

This starter material 12 is solubilized via a ternary solvent system into an initial stream 13 to yield a homogenous liquid phase 14. This phase 1–4 is subjected to a hydrogenation step 15. The hydrogenation step converts 2-ethyl anthraquinone to 2-ethyl anthrahydroquinone and tetrahydro 2-ethyl anthraquinone to tetrahydro 2-ethyl anthrahydroquinone to comprise a hydrogenated solution 16. The hydrogenated solution 16 is then subjected to a particulate removal step 18 so as to remove any catalyst fines. The now filtered hydrogenated solution is oxidized via a membrane perfusion reactor 20, which consists of a porous membrane system to produce finely divided air bubbles to saturate the solution with oxygen. As can be noted in Equation 2, supra, this oxidation step regenerates the starter anthraquinone materials and the desired product, hydrogen peroxide.

The oxidized solution 21, now containing hydrogen peroxide, is contacted with a pervaporation membrane 23 associated with a pervaporation and/or perstraction process 22 so as to produce a permeate 25 containing polar, volatile compounds, namely water and hydrogen peroxide. This permeate 25 can be subjected to further polishing 26 such as distillation so as to boil off water and other lower fractions, thereby leaving the hydrogen peroxide. Materials retained by the pervaporation membrane 23, such as solvents and anthraquinones are recirculated via a recirculation means 24 back to the make-up stream step 13, noted supra, for reuse.

Solvent System Detail

In the pure state, 2-ethyl anthraquinone (EAQ) and tetrahydro 2-ethyl anthraquinone (THEAQ) are solids and must be pretreated by being dissolved in an appropriate solvent system. The EAQ and THEAQ are soluble in one type of solvent and their hydrogenation products 2-ethyl anthrahydroquinone (EAHQ) and tetrahydro 2-ethyl anthrahydroquinone (THEAHQ), respectively, are soluble in another type of solvent. The mix of the EAQ and THEAQ, and their hydrogenation products, all dissolved in their appropriate solvents, is called the anthraquinone working solution (AQS).

The initial stream 13 results from the use of a ternary solvent mix solvent A, B and C. Solvent A is chosen to dissolve EAQ and THEAQ, which are readily soluble in alkylated aromatic solvents. Solvent B is chosen to solubilize the hydrogenated intermediates EAHQ and THEAHQ, which are polar compounds. Solvent C provides more compatibility between the two solvent systems, and also improves the rate and selectivity of the hydrogenation step.

Solvent A is a mixture of alkylated aromatics. A suitable mixture, commercially available from Shell Oil Co., is CYCLO-SOL 63™. This trade name compound is typically bench-marked as having 80 percent C-10 and C-11 alkyl benzenes, 3.2 percent C-8, C-9 and C-12 alkyl benzenes, 13.3 percent cyclo alkyl benzenes, and 3.5 percent naphthalene. Other suitable alkylated aromatics are commercially available from Exxon Corp., as Aromatic 150™ and Aromatic 100™.

Solvent B is a polar solvent, such as Tri(w-ethyl hexyl) phosphate (TOF). Another suitable polar solvent for solubilizing the hydrogenated anthraquinone materials is diisobutylcarbinol.

Solvent C candidates include tetra alkyl ureas such as N,N-Diethyl-N,N-Di-n-Butyl-urea (DEDBU).

A typical composition of the working solution (AQS) is disclosed in Table 1, below:

TABLE 1

Composition of an Exemplary Anthraquinone Working Solution

| Component | Weight Percent[1] |
| --- | --- |
| 2-ethyl anthraquinone (EAQ) | 4.5 |
| tetrahydro 2-ethyl anthraquinone (THEAQ) | 13.0 |
| Polar Solvent[2] | 10.0 |
| Tetra alkyl urea[3] | 0–10 |
| Inerts + miscellaneous[4] | 4.0 |
| Alkylated aromatic solvent[5] | remainder |

[1] Values to add to 100.
[2] A suitable polar solvent is tri (w-ethyl hexyl) phosphate.
[3] A suitable urea compound is N,N-Diethyl-N,N-Di-n-Butyl urea.
[4] Inerts generally are epoxides of anthraquinones.
[5] Such as Cyclo-sol-63.

The above exemplary composition should not be construed as limiting the anthraquinone working solution to certain weight percent values. Rather, a myriad of weight percents for the AQS working solution produce good results. For example, suitable ranges for 2-ethyl anthraquinone is approximately 3.5 to 6 weight percent. Suitable ranges for the tetrahydro 2-ethyl anthraquinone is approximately 10 and 15 weight percent. A suitable range for the polar solvent is approximately 8 to 12 weight percent.

Hydrogenation Detail

The hydrogenation step 15 is carried out in a fixed bed reactor at pressures ranging from approximately 3 to 10 atmospheres, and at temperatures ranging from between approximately 35° C. and 70° C., with preferred temperatures ranging from between approximately 40° C. and 50° C. The catalyst in the hydrogenation reactor is comprised of any of the suitable catalysts known to foster the reduction of the quinone group to the hydroquinone group, as for instance Raney nickel, or one of the noble metals such as ruthenium, rubidium, platinum, rhodium or palladium. Palladium, as one of the more common catalysts employed, is used herein at 0.3–0.35 weight percent dispersed on alumina, wherein the alumina used is delta or theta alumina and therefore substantially free of alpha, gamma, or alpha alumina monohydrate.

The hydrogen feed 17 is substantially free of catalyst poisoning chemicals, such as sulfur compounds, carbon monoxide, and chlorine compounds. Also, to maintain a positive output at bleed-offs and through the hydrogenation reactor, between approximately 1 and 10 percent of the hydrogen feed 17 is an inert carrier gas such as nitrogen, argon, neon, helium and noble fluids, generally.

Fresh hydrogen is mixed with recycled hydrogen and fed with the AQS in a down-flow mode to the packed bed hydrogenation reactor 15 where the catalyst particles are dispersed in vertical cylindrical tubes arranged to provide a high degree of contacting efficiency. Generally, from 20 to 200 liters per minute per square foot of catalyst bed cross area is a suitable range. After hydrogenation occurs in the tubular reactors, the converted gas is re-compressed and recycled via a gas recirculation loop 19 while the AQS is passed through in-line filters in the particulate removal step 18 to remove any hydrogenation catalyst fines. In as much as the hydrogenation step is somewhat exothermic, the hydrogenated AQS may need to be cooled prior to feeding the solution to the next phase of the process, which is the oxidation step, discussed below. Solution temperatures adjusted to between approximately 20° C. and 70° C. are suitable for the next step of the process.

Oxidation Detail

As noted above, conventional oxidation processes employ packed bed or bubble column reactors which require large reactor volumes and heights. However, the invented method utilizes more compact membrane-based perfusion contactors.

Membranes with very high porosity that can enable the dispersion of very fine gas bubbles into a liquid stream are used to mix an oxygen containing fluid, such as air, oxygen gas, or some other oxygen-containing gas, into the hydrogenated AQS and oxidize it. One such membrane, comprised mainly of polypropylene, is manufactured by Hoechst Celanese Inc. and sold under the trade name Cellgard™. Oxidation via the Cellgard™ membrane occurs in the oxidation step 20 when liquid contacts a first side of the membrane and the oxygen-containing fluid (e.g. gas such as air or oxygen) contacts a second side of the membrane. The gas which may be compressed, first flows through microtubules contained on the second side of the membrane. The microtubule structure allows the gas to pass through the fine pores of the first side of the membrane to mix with the liquid. Generally, the average residence time of the liquid in the perfusion membrane can range from between approximately 0.5 minutes to 5 minutes. Oxygen-containing gas pressures applied to the second side of the membrane can range from between approximately 1–4 atmospheres (15–60 psi).

The use of these types of membranes results in very high contact efficiency between liquid and gas. Furthermore, unlike typical oxidation modules, small volume structures provide suitable oxidation rates, with oxidation reactor volumes reduced by approximately 90 percent. This type of oxidation module 20 provides tremendous operational flexibility for easy start up and shut down while also accommodating variations in production rates.

Other suitable membranes can, be made from finely sintered metals, ceramic and polymeric materials, such as polysulfonic and polyvinylidenefluoride.

$H_2O_2$ Separation Detail

The nominal concentration of $H_2O_2$ in the oxidized AQS solution 21 is 10–20 grams per liter. As noted above, it is the separation of this low concentration of $H_2O_2$ from the reaction liquor, and concomitantly obtaining the same $H_2O_2$ concentration in the permeate, that proves to be problematic with conventional production processes.

The invented extraction process 22 utilizes pervaporation membranes 23 to greatly simplify the extraction process, particularly for small or mini-plant operations. In this pervaporation process step, hydrophilic membranes enable the permeation of aqueous and volatile hydrophilic constituents of the mixture while retaining the non-hydrophilic and non-volatile constituents for recycle.

Generally, the pervaporation membranes 23 employed consist of a nonporous polyvinyl alcohol active layer on a porous supporting layer. For example, membranes manufactured by GFT, Inc. in Neunkirchen-Heinitz, Germany, having the GFT PerVap 1001 or 1005 trade names consist of a non-porous polyvinyl alcohol active layer on a porous supporting layer made of polyester and polyacrylonitrile which are resistant to organics. Another membrane which has alkali resistance is marketed as GFT PerVap 2001. Here, the porous supporting layer is poly-acrylonitrile, only. Another Manufacturer of such membranes is Texaco, Inc. of White Plains, N.Y., and a typical hydrophilic membrane is TexSep 1B. Membranes made of Nafion (Dupont) which is hydrophilic-derivatized Teflon also can be used.

The oxidized AQS, which contains low concentration of hydrophilic compounds and volatile $H_2O_2$, is fed to the pervaporation unit where $H_2O_2$ and $H_2O$ selectively permeates through the membrane. The organics, including the polar but nonvolatile solvent tri (w-ethyl hexyl) phosphate, are retained and recirculated via a recirculation loop 24. A number of advantages are realized as a result of the utilization of the pervaporation unit. First, the selectivity of the membrane is very high (>>100) and hence the resulting $H_2O_2$ permeate 25 is essentially organic free. Furthermore, solvent losses are negligible. These low solvent concentrations in the permeate also results in the elimination of the formation of undesirable emulsions in permeate streams, which is typical in conventional processes.

$H_2O_2$ flux rates through the pervaporation membrane of 0.1 to 1.0 kilograms per minute per square meter are obtained in the invented process. Desired flux rates, and desired concentrations of $H_2O_2$ (i.e. 10–50 percent $H_2O_2$ in water) can be maintained by the addition of water to the AQS stream during pervaporation. One preferable final target $H_2O_2$ concentration is approximately 40 percent $H_2O_2$ in water.

Water also can be added to the permeate side of the membrane. Given that water has an affinity to pull $H_2O_2$ out of solution, this modified process essentially becomes a pervaporation/perstraction stage whereby the added water enhances the $H_2O_2$ extraction from the AQS. The amount of water added to the AQS stream is determined by the desired final concentration of $H_2O_2$. Alternatively, only a first amount of water can be added to the AQS process stream, with a second amount of water to be added to the permeate, to achieve desired $H_2O_2$ dilutions.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for producing hydrogen peroxide comprising
    a.) supplying an anthraquinone-containing solution;
    b.) subjecting said solution to hydrogen to hydrogenate the anthraquinone;
    c.) mixing an oxygen-containing gas stream with said solution containing hydrogenated anthraquinone to oxidize the solution;
    d.) contacting said oxidized solution with a hydrophilic membrane and adding water to a permeate side of the hydrophilic membrane to produce a permeate containing hydrogen peroxide; and
    e.) recovering the hydrogen peroxide from said permeate.

2. The method as recited in claim 1 wherein the anthraquinone-containing solution contains anthraquinones and a ternary solvent mixture.

3. The method as recited in claim 2 wherein the ternary solvent mixture solubilizes the anthraquinones and hydrogenated anthraquinones into a homogenous liquor.

4. The method as recited in claim 3 wherein the ternary solvent mixture is comprised of solvents selected from the group consisting of alkylated aromatics, polar solvents, tetra alkyl ureas, and combinations thereof.

5. The method as recited in claim 1 wherein the anthraquinones are selected from the group consisting of 2-ethyl anthraquinone, tetrahydro 2-ethyl anthraquinone, 2-isopropylanthraquinone, 2-sec-butylanthraquinone, 2-t-butylanthraquinone, 2-sec-amylanthraquinone, 1,3-dimethylanthraquinone, 2,3-dimethyl-anthraquinone, 1,4 dimethylanthraquinone, 2,7-dimethylanthraquinone, amylanthraquinone, tetrahydroamylanthraquinone and combinations thereof.

6. The method as recited in claim 1 wherein the anthraquinones are selected from the group consisting of 2-ethyl anthraquinone, tetrahydro 2-ethyl anthraquinone, and combinations thereof.

7. A method for producing hydrogen peroxide comprising:
    a.) supplying an anthraquinone-containing solution;
    b.) subjecting said solution to hydrogen to hydrogenate the anthraquinone;
    c.) mixing an oxygen-containing gas stream with said solution containing hydrogenated anthraquinone to oxidize the solution;
    d.) contacting said oxidized solution with a hydrophilic membrane to produce a permeate; and
    e.) recovering the hydrogen peroxide from said permeate wherein the step of mixing an oxygen-containing gas with the solution containing hydrogenated anthraquinones further comprises:
    f.) supplying a perfusion membrane having a first side and a second side;
    g.) contacting the solution with the first side of said perfusion membrane; and
    h.) contacting the second side of the perfusion membrane with an oxygen-containing gas so as to cause the gas to pass through the membrane and mix with the solution.

8. The method as recited in claim 7 wherein the oxygen-containing gas, stream is air that is compressed.

9. The method as recited in claim 7 wherein the step of contacting the oxidized solution with a hydrophilic membrane further comprises adding an amount of water to the oxidized solution prior to contacting the oxidized solution with the hydrophilic membrane to facilitate the permeation of hydrogen peroxide, thereby resulting in the permeate containing a predetermined concentration of hydrogen peroxide in water.

10. The method as recited in claim 7 wherein the step of contacting the oxidized solution with a hydrophilic membrane further comprises:
    a.) determining a final amount of water necessary to render a predetermined hydrogen peroxide concentration in the permeate, said final amount of water the sum of a first amount of water and a second amount of water;
    b.) adding said first amount of water to the oxidized solution prior to contacting the oxidized solution with the hydrophilic membrane;
    c.) contacting the water and oxidized solution mixture with the hydrophilic membrane; and
    d.) adding the second amount of water to the permeate.

11. A method for producing hydrogen peroxide comprising:
    a.) supplying a homogenous liquor containing anthraquinones and a ternary solvent mixture;
    b.) subjecting said liquor to hydrogen to produce hydrogenated anthraquinones;
    c.) exposing said liquor containing said hydrogenated anthraquinones to oxygen-containing gas via a perfusion reactor to produce a mixture containing hydrogen peroxide and to regenerate said anthraquinones;
    d) contacting said mixture containing hydrogen peroxide and regenerated anthraquinones with a pervaporation membrane and adding water to a permeate side of the membrane so as to create a hydrogen peroxide permeate and a working solution retentate; and
    e.) recovering the hydrogen peroxide from the permeate.

12. The method as recited in claim 11 wherein the anthraquinones are selected from the group consisting of 2-ethyl anthraquinone, tetrahydro 2-ethyl anthraquinone.

13. The method as recited in claim 11 wherein the ternary solvent liquor contains solvents selected from the group consisting of alkylated aromatics, polar solvents, tetra alkyl ureas, and combinations thereof.

14. The method as recited in claim 13 wherein the aklykated aromatics are capable of dissolving anthraquinones, the polar solvents are capable of dissolving hydrogenated anthraquinones, and the tetraalkyl ureas are selected to homogenize the ternary solvent system.

15. The method as recited in claim 11 wherein the hydrogenated anthraquinones are selected from the group consisting of 2-ethyl anthrahydroquinone, tetrahydro 2-ethyl anthrahydroquinone, and combinations thereof.

16. The method as recited in claim 11 wherein the pervaporation membrane is hydrophilic.

17. A method for producing hydrogen peroxide comprising:

a.) supplying a homogenous liquor containing anthraquinones and a ternary solvent mixture;

b.) subjecting said liquor to hydrogen to produce hydrogenated anthraquinones;

c.) exposing said liquor containing said hydrogenated anthraquinones to oxygen-containing gas via a perfusion reactor to produce a mixture containing hydrogen peroxide and to regenerate said anthraquinones;

d.) contacting said mixture containing hydrogen peroxide and regenerated anthraquinones with a pervaporation membrane so as to create a hydrogen peroxide permeate and a working solution retentate; and e.) recovering the hydrogen peroxide from the permeate, wherein the step of exposing said liquor containing said hydrogenated anthraquinones to oxygen-containing gas via a perfusion reactor to produce a mixture containing hydrogen peroxide and to regenerate said anthraquinones further comprises:

f.) supplying a perfusion membrane having a first side and a second side;

g.) contacting the liquor with the first side of said perfusion membrane; and h.) contacting the second side of the perfusion membrane with an oxygen-containing gas so as to cause the gas to pass through the membrane and mix with the liquor.

18. The method as recited in claim 17 wherein the step of contacting said mixture containing hydrogen peroxide and regenerated anthraquinones with a pevaporation membrane so as to create a hydrogen peroxide permeate and a working solution retentate is preceded by combining said mixture containing hydrogen peroxide and regenerated anthraquinones with an amount of water so as to result in the permeate containing a predetermined concentration of hydrogen peroxide in water.

19. The method as recited in claim 18 wherein the predetermined concentration of hydrogen peroxide is selected from a range of between 10 percent and 50 percent hydrogen peroxide in water.

20. The method as recited in claim 18 wherein the predetermined concentration of hydrogen peroxide is approximately 40 percent hydrogen peroxide in water.

* * * * *

UNITED STATES PATENT AND TRADEMARK OFFICE
CERTIFICATE OF CORRECTION

PATENT NO.   : 5,662,878
DATED        : September 2, 1997
INVENTOR(S)  : Datta et al.

It is certified that error appears in the above-indentified patent and that said Letters Patent is hereby corrected as shown below:

Column 8, line 25, after the word "containing," delete "gas," and insert the word --gas--.

Column 10, line 16, after the word "a," delete "pevaporation" and insert the word --pervaporation--.

Signed and Sealed this

Twenty-third Day of June, 1998

Attest:

BRUCE LEHMAN

*Attesting Officer*    *Commissioner of Patents and Trademarks*